United States Patent [19]

Haraguchi et al.

[11] Patent Number: 4,963,905
[45] Date of Patent: Oct. 16, 1990

[54] CAMERA

[75] Inventors: Shosuke Haraguchi; Masanori Ishikawa, both of Kanagawa, Japan

[73] Assignee: Canon Kabushiki Kaisha, Tokyo, Japan

[21] Appl. No.: 278,345

[22] Filed: Dec. 1, 1988

[30] Foreign Application Priority Data

Dec. 4, 1987 [JP] Japan ................................ 62-307035
Dec. 8, 1987 [JP] Japan ................................ 62-310130

[51] Int. Cl.⁵ ......................... G03B 1/12; G03B 19/12
[52] U.S. Cl. .................................. 354/152; 354/173.1; 354/204
[58] Field of Search ...................... 354/152, 173.1, 204

[56] References Cited

U.S. PATENT DOCUMENTS

| | | | |
|---|---|---|---|
| 4,504,131 | 3/1985 | Kimura | 354/173.1 |
| 4,733,265 | 3/1988 | Haraguchi et al. | 354/484 |
| 4,758,859 | 7/1988 | Nematsu et al. | 354/204 X |
| 4,816,851 | 3/1989 | Fukahori et al. | 354/173.1 |
| 4,827,296 | 5/1989 | Haraguchi et al. | 354/187 |
| 4,881,092 | 11/1989 | Fukahori et al. | 354/152 |

Primary Examiner—Michael L. Gellner
Attorney, Agent, or Firm—Fitzpatrick, Cella, Harper & Scinto

[57] ABSTRACT

A camera of the pre-winding type having a built-in motor, in which a loaded film is wound prior to a photographing operation which is performed with the film being rewound, comprises a motor, a film winding mechanism arranged to be driven by the motor serving as a drive source, a mirror mechanism arranged to be driven by the motor serving as a drive source, a film rewinding mechanism arranged to be driven by the motor serving as a drive source, and a switching mechanism for transmitting an output of the motor to the film winding mechanism of the mirror mechanism in response to rotation of the motor in a first direction and for transmitting an output of the motor to the film rewinding mechanism in response to rotation of the motor in a second direction, the switching mechanism being arranged to change over the transmission of an output of the motor when rotating in the first direction from transmission to the film winding mechanism to transmission to the mirror mechanism in response to the rotation of the motor in the second direction.

16 Claims, 6 Drawing Sheets

CAMERA

BACKGROUND OF THE INVENTION

Field of the Invention

This invention relates to a camera arranged to be driven by a motor incorporated in the camera.

Description of the Related Art

The conventionally known single-lens reflex cameras include a film pre-winding type camera arranged to wind up the film within the camera before the film is used for shooting. The conventional film pre-winding type cameras, however, have presented a problem in terms of operability as they are not arranged to be of the kind having a motor drive incorporated therein.

Meanwhile, as a result of recent progress in efforts to fully automate single-lens reflex cameras, there have been proposed single-lens reflex cameras of the kind arranged not only to have a built-in motor drive but also to have a mirror operated by means of an electric motor. For example, a single-lens reflex camera of that kind has been disclosed in U.S. patent application Ser. No. 139,844 filed on Dec. 29, 1987. However, in order to have all the actions of a single-lens reflex camera by means of motors, the camera must be provided with many motors. Besides the motors, it also requires many power transistors and other expensive elements. Therefore, it much increases the manufacturing cost of the camera.

Further, various film-prewinding type cameras which incorporate motors have been proposed during recent years. For example, a single-lens reflex camera of this kind has been disclosed in U.S. Pat. No. 4,504,131.

SUMMARY OF THE INVENTION

One aspect of this invention lies in the provision of a low-cost, compact single-lens reflex camera of the film pre-winding type incorporating a motor. To attain this object, the camera according to the invention is arranged to make film winding and mirror driving actions to be feasible by the rotation of the motor in a first direction; and to make film rewinding feasible by the rotation of the motor in a second direction. The arrangement permits reduction in the number of motors required for reduction in cost and size of the camera.

The above and other objects and features of the invention will become apparent from the following detailed description of an embodiment thereof taken in connection with the accompanying drawings.

DETAILED DESCRIPTION OF THE PREFERRED EMBODIMENT

Figure 1:
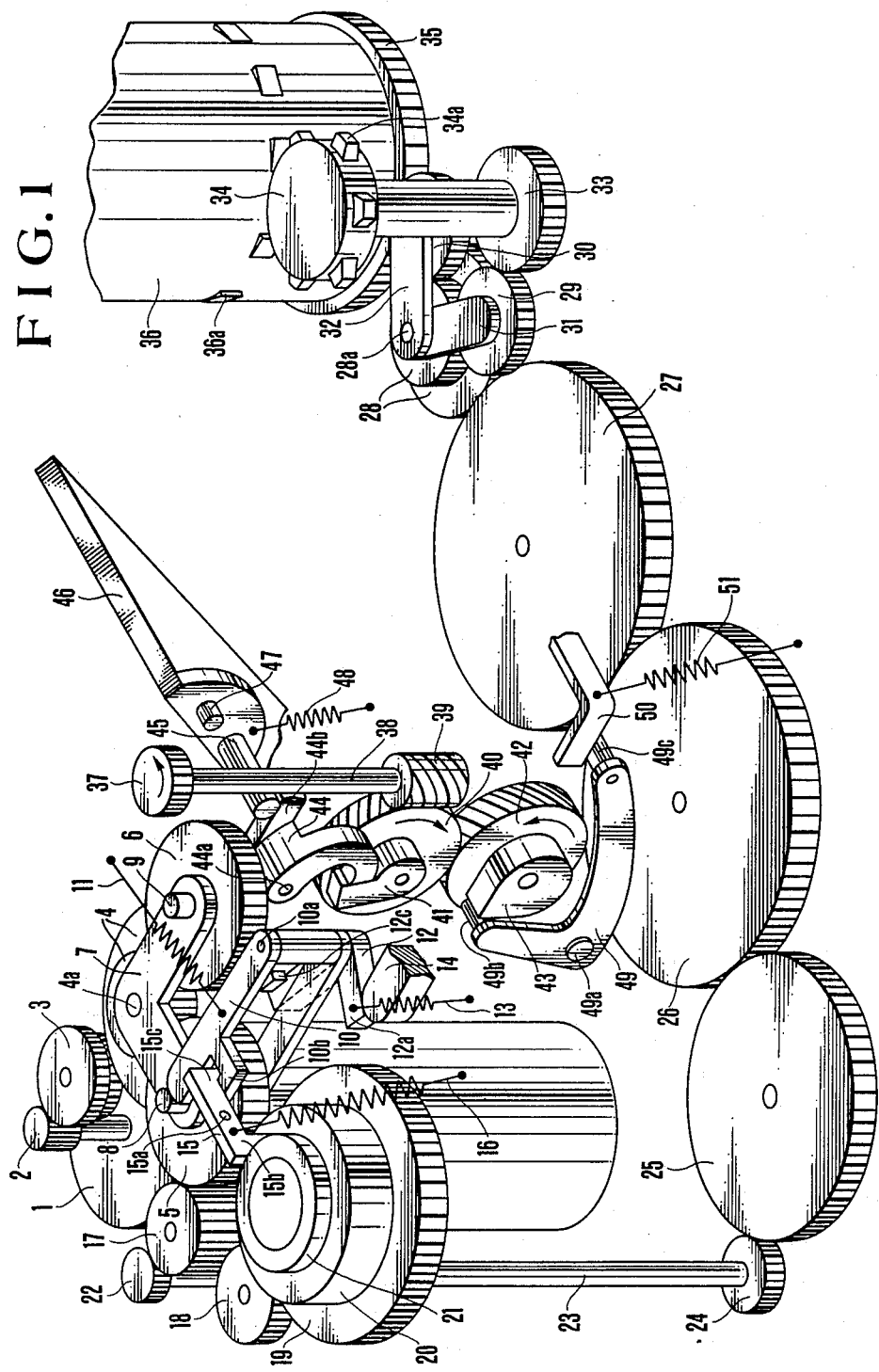
FIG. 1 is an oblique view showing the essential parts of the internal mechanism of a camera arranged according to this invention.
Figure 2:
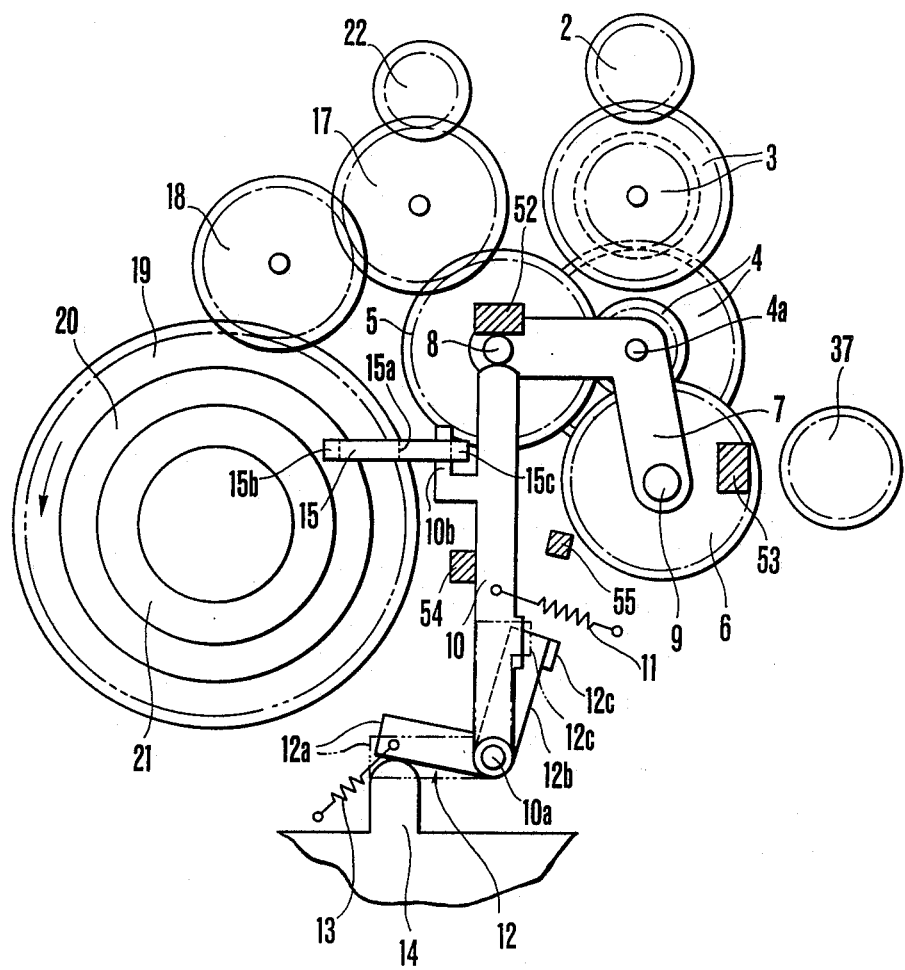
FIGS. 2 and 3 are enlarged plan views showing a portion of the mechanism of FIG. 1 related to power transmission means.
Figure 3:
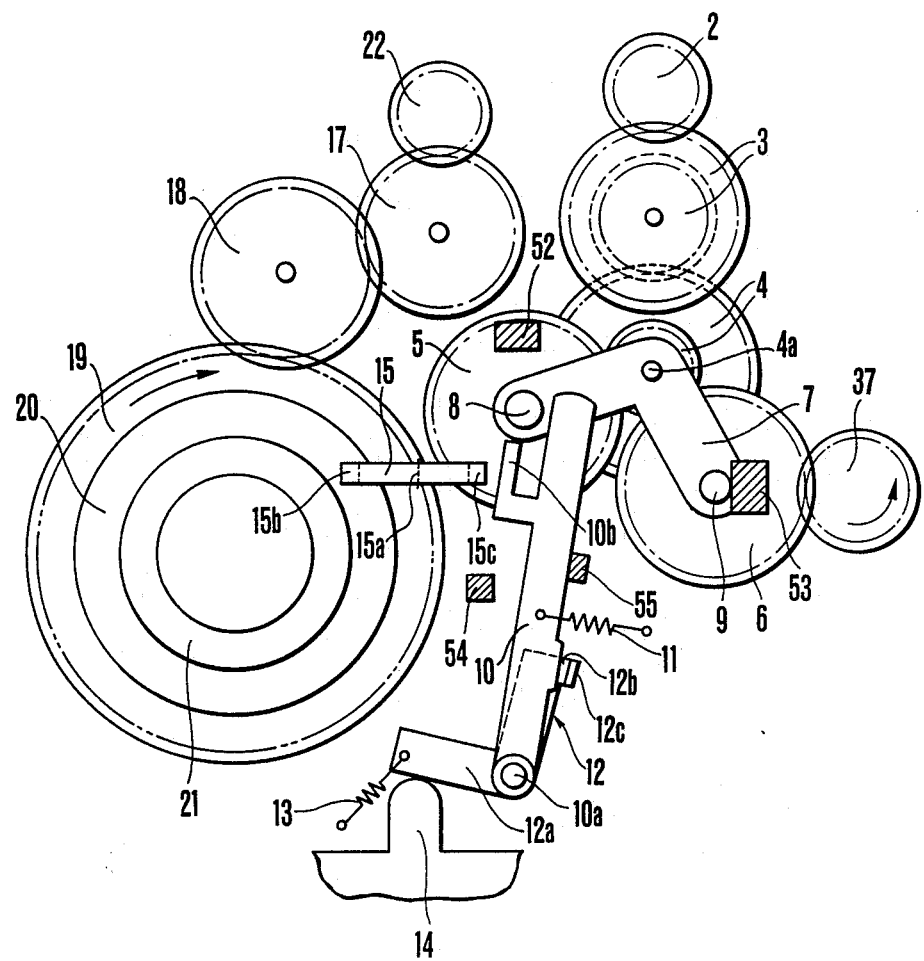
Figure 4:
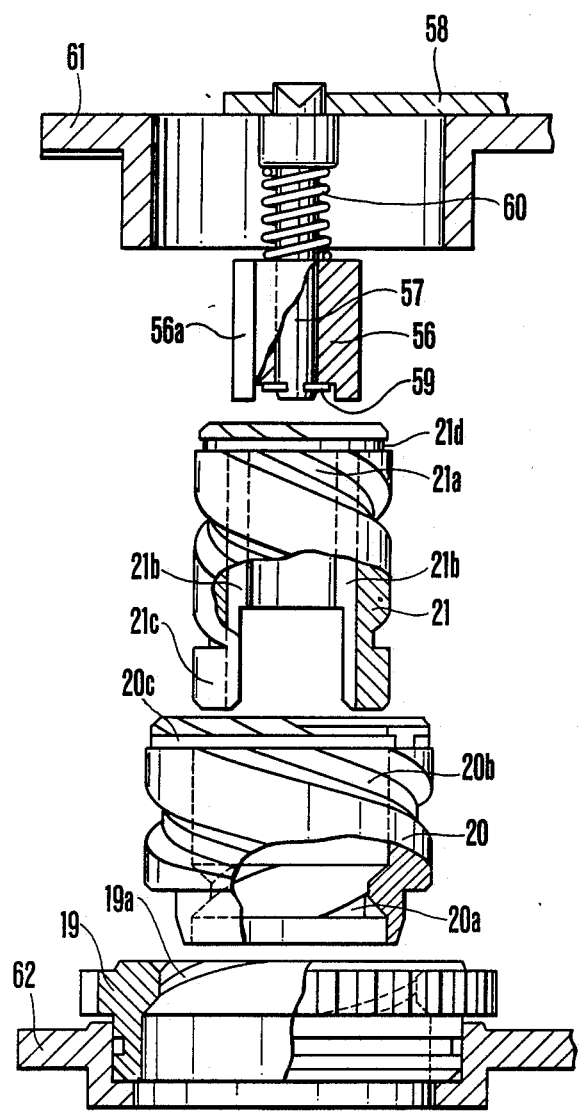
FIG. 4 shows a film rewinding mechanism in an exploded state.
Figure 5:
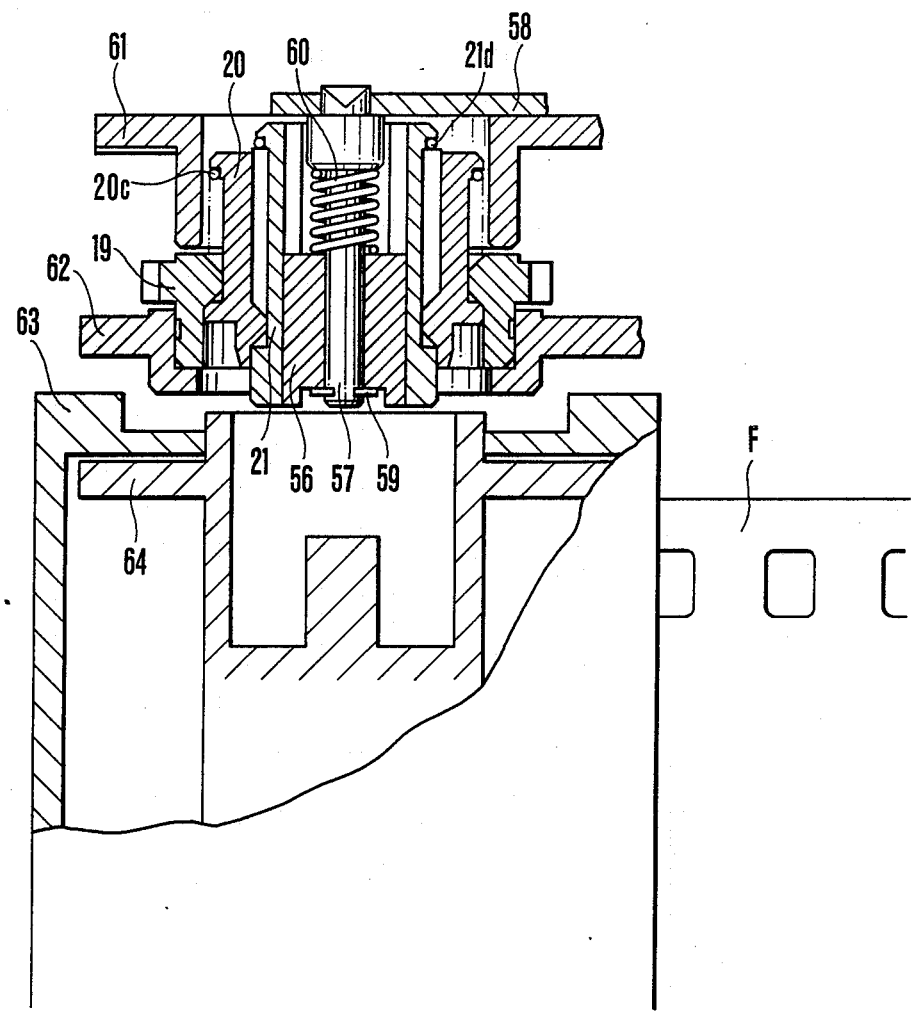
FIGS. 5 and 6 are sectional views showing the film rewinding mechanism in two different states thereof.
Figure 6:
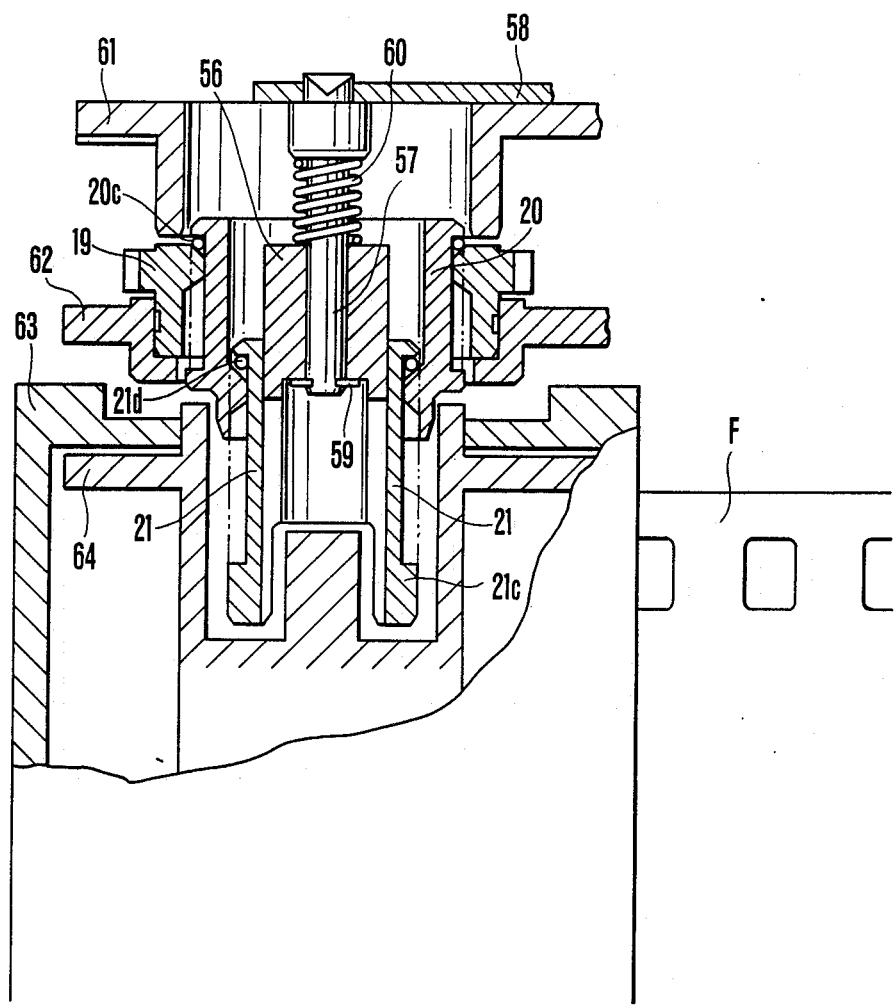

FIG. 1 is an oblique view showing by way of example a power transmission system provided for the film driving mechanism and the mirror driving mechanism of a camera arranged according to this invention as an embodiment thereof. FIGS. 2 and 3 are enlarged plan views showing power transmission means included in the power transmission system of FIG. 1 in an operating state. FIG. 4 shows a film rewinding mechanism in an exploded state. FIGS. 5 and 6 show the film rewinding mechanism in an operating state.

Referring to FIGS. 1, 2 and 3, the illustrations include a motor 1; a pinion 2 which is secured to the shaft of the motor 1; an intermediate gear 3 of the double gear type consisting of a large gear part which meshes with the pinion 2 and a small gear part which meshes with a sun gear 4; the sun gear 4 which is arranged to form a planetary clutch mechanism in conjunction with two planet gears 5 and 6 and an L-shaped planet lever 7; a gear 17 arranged to be capable of meshing with the planet gear 5 (as shown in FIG. 1); a gear 18 arranged to constantly mesh with the gear 17 and also to mesh with a rewinding gear 19 which will be described later; a gear 22 which is secured to the upper end of a transmission shaft 23 and is arranged to constantly mesh with the gear 17; a gear 37 which is secured to the upper end of a mirror driving shaft 38 and is arranged to be capable of meshing with the planet gear 6; a cylindrical sub-fork 20 which is screwed to the inner circumferential face of the rewinding gear 19; a fork member 21 which is screwed to the inner circumferential face of the sub-fork 20; a known quick-return mirror 46 which is usually mounted on a single-lens reflex camera; a gear 24 which is secured to the lower end of the transmission shaft 23; gears 25, 26 and 27 which form a part of a film winding mechanism; and a sun gear 28 of the double gear type consisting of a large gear part which meshes with the gear 27 and a small gear part which meshes with planet gears 29 and 30. The large and small gear parts of the sun gear 28 are in a differential type reduction gear connection. More specifically, the small gear part has a first gear formed in its inside diameter. The large gear part has a second gear formed to mesh with the first gear. The small gear part is thus arranged to have its rotating speed reduced and to rotate in a direction reverse to that of the large gear part. Planet gears 29 and 30 are arranged to mesh with the small gear part of the sun gear 28 and to be carried by other planet levers 31 and 32, respectively. A sprocket 34 is arranged to be driven by a gear 33 which is arranged to be capable of meshing with the planet gear 29. A spool gear 35 is formed in one unified body with a spool 36 and is arranged to be capable of meshing with the planet gear 30.

The above stated component parts and other related parts are described in further detail with reference to FIGS. 1, 2 and 3 as follows: The planet lever 7 is loosely fitted on the shaft 4a of the sun gear 4 and is in frictional contact with the sun gear 4 via a spring which is not shown. The shafts of the planet gears 5 and 6 are loosely fitted on the fore ends of the two arms of the lever 7. The lever 7 is in frictional contact with the planet gears 5 and 6 by springs (not shown) which are inserted in between the lower face of the lever 7 and the upper face of each of the planet gears 5 and 6. Shaft-like projections 8 and 9 are provided on the upper faces of the fore end parts of the arms of the planet lever 7. These projections 8 and 9 are concentric with the shafts of the planet gears 5 and 6. As shown in FIGS. 2 and 3, the shaft-like projections 5 and 6 are arranged to abut on fixed stoppers 52 and 53 in such a way as to restrict the maximum turnable range of the lever 7. Further, the projection 8 is arranged to abut on the fore end of a lever 10 when the planet lever 7 is in its position as shown in FIG. 2 in such a way as to keep the lever 7 there.

The above stated lever 10 is disposed at a position between the planet gear 6 and the rewinding gear 19 in such a way as to be swingable around a shaft (not shown) which is inserted in a shaft hole 10a provided in the lever 10. The lever 10 is thus arranged to be swingable between fixed stoppers 54 and 55. The lever 10 has two arms which horizontally extend and are vertically spaced and separated from each other. Under the condition shown in FIG. 2, the fore end of the upper arm abuts on the shaft-like projection 8 of the planet lever 7 and that of the lower arm the downward protruding shaft of the planet gear 5 which is not shown. The upper arm of the lever 10 is provided with a protrusive L-shaped engaging part 10b which is arranged on the left side face of the lever 10 to engage a projection 15c provided on one side of a lever 15 which will be described later. The lever 10 is urged by a spring 11 to turn clockwise around its shaft hole 10a as viewed on FIG. 2. However, when the projection 15c of the lever 15 is engaging the engaging part 10b, the lever 10 is in repose in the position of abutting on the fixed stopper 54. Further, the fore end face of the lever 10 which is arranged to abut on the shaft-like projection 8 is in an arcuate shape having the shaft hole 10a in its center. This enables the shaft-like projection 8 to smoothly slide over the lever 10.

The lever 15 horizontally extends from an upper part of the sub-fork 20 over to an upper part of the lever 10. At a pin hole 15a which is provided in the middle part of the lever 15, a fixed pin (not shown) swingably carries the lever 15. The lever 15 is provided with a downward projection 15b which is arranged at one end part of the lever 15 to abut on the upper face of the sub-fork 20 and another downward projection 15c which is arranged at the other end of the lever 15 to engage the engaging part 10b of the lever 10. A spring 16 which is shown in FIG. 1 constantly exerts a downward urging force on the left end part of the lever 15. Under the condition as shown in FIG. 1, the spring 16 thus pushes the projection 15b against the upper face of the sub-fork 20. Therefore, when the sub-fork 20 moves upward, the projection 15c descends to engage the engaging part 10b of the lever 10. When the sub-fork 20 moves downward, the projection 15c ascends to disengage the lever 15 from the lever 10.

A lever 12 which has a pivotal shaft thereof arranged to be concentric with the shaft hole 10a of the lever 10 is disposed just below the lever 10. The lever 12 has two arms 12a and 12b which are formed in one body. The arm 12b is provided with a protrusive engaging part 12c which is arranged to engage the right side face of the lower arm of the lever 10. The other arm 12a is urged by a spring 13 to turn counterclockwise around its pivotal shaft as viewed on FIG. 2. The spring 13 is arranged to have a stronger urging force than that of the spring 11 which is urging the lever 10. As will be described later, therefore, the lever 10 is forced to return from the position of FIG. 3 to the position of FIG. 2 by the force of the spring 13 when the back lid of the camera is opened.

The back lid (not shown) is provided with a back lid projection 14 on the inner side thereof. When the back lid is closed, the back lid projection 14 pushes the arm 12a toward the front side of the camera to cause the lever 12 to turn clockwise around its pivotal axis. Further, in the case of this embodiment, the camera is provided with a switch (not shown) which is arranged to detect the opening and closing movements of the back lid in the initial stages of these actions. The motor 1 is arranged to be controlled in accordance with the detecting action of this switch.

The mirror 46 is carried by a frame (not shown) in such a way as to be turnable around a support shaft 47. In FIG. 1, the mirror 46 is shown as in a state of being urged to turn counterclockwise around the shaft 47. A pin 45 which is protruding in parallel to the shaft 47 from the side face of the mirror 46 is pushed onto an arm 44b of a mirror driving lever 44 by means of a spring 48. The mirror driving lever 44 is provided with a pivotal pin hole 44a which is in parallel with the pin 45. The mirror driving lever 44 is thus arranged to be turnable around a pivotal pin (not shown) which is inserted in the hole 44a.

A worm 39 which is secured with the lower end of the mirror driving shaft 38 meshes with a helical gear 40. The helical gear 40 is arranged to rotate around an axis which is in parallel to the above stated pin 45. A cam 41 is secured to the shaft of the helical gear 40 and engages the mirror driving lever 44.

Another helical gear 42 which meshes with the helical gear 40 is provided with a cam 43 which is concentric with the gear 42. The cam 43 engages a pin 49b provided on one end of a charge lever 49 which is arranged to swing around a shaft 49a thereof. A pin 49c provided on the other end of the charge lever 49 engages one end of a shutter charge lever 50. The shutter charge lever 50 is urged by a spring 51 downward (in FIG. 1) to come into pressure contact with the charge lever 49. The shutter charge lever 50 is thus arranged to keep in a clamped state the leading and trailing curtains of a shutter which is not shown. The shutter curtains are arranged to be released from the clamped state when the lever 50 is driven downward by the charge lever 49. Then, the leading and trailing curtains of the shutter are allowed to travel with a power supply effected to electromagnets which are provided for controlling these shutter curtains.

As mentioned in the foregoing, a planetary clutch mechanism for driving the film winding sprocket 34 and the spool 36 is provided with two planet levers 31 and 32. The planet lever 31 and 32 are both fitted on the shaft 28a of the sun gear 28 and are arranged to independently rotate around the shaft 28a.

Claws 34a which are formed on the circumferential face of the sprocket 34 and claws 36a which are formed on that of the spool 36 are arranged to engage perforations provided in the film. The film is forcedly driven by these claws to longitudinally move. Further, the spool gear 35, the gear 33, the planet gears 29 and 30, the sun gear 28, etc. have their teeth arranged in such numbers as to allow the spool 36 to have a higher peripheral velocity than that of the sprocket 34. Therefore, when the film moves from the claws 34a of the sprocket 34 to the claws 36a of the spool 36, the film is stretched, so that the film can be tightly taken up around the spool 36. Although there arises some difference between the film feeding speed of the claws 34a and that of the claws 36a in this instance, the difference in film feeding speed can be absorbed by the clockwise revolution of the planet gear 29 caused by the gear 33 as the planet lever 31 receives from the gear 33 a clockwise torque developed around the shaft 28a.

Next, referring to FIGS. 4, 5 and 6, the film rewinding mechanism of the camera according to this invention is arranged as follows: A cylindrical fork member 21 has a known fork 21c formed at the fore end thereof. A sub-fork 20 is formed in a cylindrical shape. A rewinding gear 19 is formed either in a ring shape or in a cylindrical shape. A key member 56 has keys 56a formed at the peripheral part thereof in the axial direction. A stationary shaft 57 is arranged to rotatably carry the key member 56 and to have its head part secured to a support plate 58. An E-shaped ring 59 is arranged to hold the key member 56 from pulling out off the stationary shaft 57. A spring 60 is arranged to push the key member 56 against the E-shaped ring 59 in such a way as to prevent the key member 56 from turning under any load torque that is below a given value. A keep plate 61 is provided with a cylindrical part for stowing the upper half part of the sub-fork 20 and has the support plate 58 secured thereto. A support member 62 is arranged to rotatably carry the rewinding gear 19. A reference numeral 63 denotes a film cartridge. A numeral 64 denotes a film spool disposed within the film cartridge 63. A reference symbol F denotes the film being taken out from the cartridge 63.

The fork member 21 has a screw groove 21a formed on the outer circumferential surface thereof. A groove is formed in the outer circumferential face of the fork member 21 in the circumferential direction at the end of the member 21 on the side opposite to the fork 21c. A ring-like stopper 21d is fitted in this groove. Key ways 21b are formed in the inner circumferential face of the fork member 21 in the axial direction in such a way as to have the keys 56a of the key member 56 slidably fitted therein.

The sub-fork 20 has an axial hole of a diameter which allows the fork member 21 to be inserted therein. A screw-like projection 20a is formed on the circumferential face of the lower end of the axial hole and is arranged to be screwed on the screw groove 21a of the outer circumferential face of the fork member 21. In the outer circumferential face of the sub-fork 20 is formed a screw groove 20b which is screwed to a screw-like projection 19a provided on the inner circumferential face of the rewinding gear 19. A ring-like stopper 20c is fitted into a groove formed in the circumferential direction in the outer circumferential face of the upper end of the sub-fork 20.

The rewinding gear 19 which is provided with an axial hole having a sufficient diameter for insertion of the sub-fork 20 is rotatably carried by and disposed within the support member 62. The outer teeth of the gear 19 mesh with those of the gear 18.

FIG. 5 shows the film rewinding mechanism which is arranged in the above stated manner in an unused state and in a state obtained during a film winding action. Under this condition, the fork member 21 is stowed within the sub-fork 20. Meanwhile the sub-fork 20 is stowed within the cylindrical part of the keep plate 61 together with the rewinding gear 19 by being retracted from the film cartridge 63.

FIG. 6 shows the film rewinding mechanism in process of a film rewinding action. The rewinding gear 19, the sub-fork 20 and the fork member 21 are in a rightward screwed relation as viewed on FIG. 2. When the rewinding gear 19 is rotated counterclockwise as viewed on FIGS. 2 and 5, there arises no axial movement among the three parts relative to each other and they are rotated counterclockwise together in their set positions. In the event of clockwise rotation of the rewinding gear 19 as viewed on FIGS. 2 and 5, the three parts axially move relative to each other and the fork member 21 is inserted into the film cartridge 63. On the other hand, under the condition of FIG. 6, the three parts axially move relative to each other when the rewinding gear 19 is rotated counterclockwise, and they do not axially move relative to each other but are rotated clockwise together when the rewinding gear 19 is rotated clockwise.

Each of the parts of the camera arranged according to this invention as described above operates as follows: Before the camera is loaded with a film cartridge, the power transmission system and the mirror driving mechanism are in a state shown in FIG. 1. When the back lid is opened, the lever 12 is in the position indicated by a two-dot-chain line in FIG. 2. The film rewinding mechanism is then in a state as shown in FIG. 5.

When the back lid is closed with the film cartridge 63 inserted into a cartridge chamber provided within the camera, the back lid projection 14 pushes the arm 12a of the lever 12 toward the inside of the camera, as shown in FIG. 2. This causes the lever 12 to turn clockwise around its pivot axis (the shaft hole 10a of the lever 10). The engaging part 12c of the lever 12 then moves away from the lever 10, thus freeing the lever 10 from a force which has been pushing the lever 10 against a stopper 54. However, since the engaging part 10b of the lever 10 is engaging the engaging part 15c of the lever 15, the lever 10 is kept in a state shown in FIG. 2.

Meanwhile, with the back lid closed, a back lid closure detection switch (not shown) operates to electrically detect the closing of the back lid. In response to the operation of this switch, a control device (not shown) actuates the motor 1. The motor 1 then causes the pinion 2 to rotate counterclockwise as viewed on FIGS. 1 and 2. The pinion 2 causes via the gear 3 the sun gear 4 to rotate counterclockwise. Therefore, the planet lever 7 also receives a torque urging it to turn counterclockwise around the shaft 4a. However, the fore end face of the lever 10 which abuts on the shaft-like projection 8 of the lever 7 prevents the lever 7 from turning. This allows the planet gear 5 to be rotated clockwise by the sun gear 4. With the planet gear 5 rotated clockwise, the gear 17 is rotated counterclockwise, and the gears 18 and 22 are rotated clockwise. With the gear 18 rotated clockwise, the rewinding gear 19 is rotated counterclockwise. However, there takes place no relative axial movement between the gear 19 and the sub-fork 20 since the screw part of the gear 19 is in screwed engagement with the end of the screw part formed on the outer circumferential face of the sub-fork 20. Further, since the sub-fork 20 and the fork member 21 are also screwed to each other at the ends of their screw parts, no relative axial movement takes place between the sub-fork 20 and the fork member 21. This allows the driving torque which is applied to the rewinding gear 19 to be transmitted as it is to the fork member 21. Then, that driving torque is transmitted from the fork member 21 to the key member 56 to rotate the key member 56. The key member 56 is interposed between and pinched by the spring 60 and the E-shaped ring 59 in such a way as not to be normally caused to rotate by a small amount of torque. In the above stated case, however, no relative axial movement occurs among the rewinding gear 19, the sub-fork 20 and the fork member 21. Therefore, the torque applied to the key member 56 becomes larger than a friction torque between the spring 60 and the key member 56. As a result, a slip takes place between the lower end face of the spring 60 and the upper end face of the key member 56, and both the key member 56 and the fork member 21 begin to rotate. Therefore, when the rewinding gear 19 is rotated counterclockwise under the condition of FIG. 5, the four parts including the rewinding gear 19, the sub-fork 20, the fork member 21 and the key member 56 come to rotate counterclockwise together around the shaft 57. In this instance, since the fork member 21 is not inserted into the film cartridge 63, a spool which is disposed within the film cartridge 63 is not rotated. The torque transmitted from the gear 18 to the rewinding gear 19 is consumed in idling these four parts.

Meanwhile, the gear 22 is rotated clockwise by the gear 17. Therefore, the gear 24 is also rotated clockwise through the transmission shaft 23. As a result, the gear 25 is rotated counterclockwise, the gear 26 clockwise and the gear 27 counterclockwise. Accordingly, sun gear 28 has its large gear part rotated clockwise and its small gear part counterclockwise. This causes the planet levers 31 and 32 which are fitted on the shaft 28a of the gear 28 to turn counterclockwise around the shaft 28a. Then, the planet gear 29 eventually comes to mesh with the gear 33, and the planet gear 30 to mesh with the spool gear 35. After that, the planet gears 29 and 30 are both cased by the small gear part of the sun gear 28 to begin to rotate clockwise. The sprocket 34 and the spool 36 begin to rotate counterclockwise at different peripheral speeds, respectively. The film F which has been pulled out from the film cartridge 63 is fed by the sprocket 34 onto the spool 36 to be gradually taken up around the spool 36. In this instance, the amount of film taken up around the spool 36 is detected by means of a film feeding amount detector which is not shown. Upon completion of winding the whole film, a control device (not shown) brings a current supply to the motor 1 to a stop in response to the output of the detector.

Immediately after that, the control device causes the motor 1 to rotate in a reverse direction. This causes the pinion 2 to begin to rotate clockwise as viewed on FIG. 2. The clockwise rotation of the pinion 2 causes the sun gear 4 to rotate clockwise. The planet lever 7 then receives a torque urging it to turn clockwise around the shaft 4a. However, since the shaft-like projection 8 of the lever 7 is abutting on the stopper 52, the lever 7 does not turn clockwise. Therefore, the planet gear 5 which meshes with the sun gear 4 is rotated counterclockwise. The gear 17 rotates clockwise, and the gear 18 counterclockwise. This causes the rewinding gear 19 to rotate clockwise. As a result, in the film rewinding mechanism which is in the state shown in FIG. 5, the sub-fork 20 is caused to begin to axially move downward by the screwed relation to the rewinding gear 19. The fork member 21 then begins to descend together with the sub-fork 20 in a state of being held by the latter. In this instance, the key member 56 does not rotate, and the keys 56a which are provided on the outer circumferential part of the key member 56 serve to axially guide the fork member 21.

With the sub-fork 20 and the fork member 21 moving downward together, when the screw-like projection 19a a provided on the inner circumferential face of the rewinding gear 19 abuts on the stopper 20c disposed at the upper end of the sub-fork 20 (see FIG. 6), the axial descent of the sub-fork 20 comes to a stop. At that moment, the sub-fork 20 begins to rotate together with the rewinding gear 19, so that a relative rotational movement takes place between the sub fork 20 and the fork member 21. Then, the fork member 21 begins to axially descend within the sub-fork 20 while retaining its non-rotating state. The fork member 21 thus comes into a recess axially formed in the film spool 64 to engage the shaft part of the film spool 64. After that, when the stopper 21d which is disposed at the upper end of the fork member 21 comes to abut on the screw-like projection 20a which is provided on the inner circumferential face of the sub-fork 20, the axial downward descent of the form member 21 comes to a stop. Further, the fork 21c engages the shaft part of the film spool 64. With the axial descent of the fork member 21 coming to a stop, a torque being transmitted from the sub-fork 20 to the fork member 21 becomes a force for rotating the fork member 21. Then, this force is applied from the fork member 21 to the key member 56 as a force for rotating the key member 56. As a result, a force for preventing the rotation of the key member 56 (a friction torque between the lower end face of the spring 60 and the upper end face of the key member 56) is overcome by the force for rotating the key member 56. Therefore, the key member 56, the fork member 21, the sub-fork 20 and the rewinding gear 19 begin to rotate all together.

As a result, the film spool 64 is rotated by the fork 21c. The film then begins to be rewound back into the film cartridge 63. The amount of film rewound is detected by the film feeding amount detector which is not shown. When the amount of film rewound reaches a given value, the above stated control device brings the rotation of the motor 1 to a stop. By this, a first frame portion of the film is positioned at an aperture.

Meanwhile, with the gear 17 rotated clockwise, the gears 22 and 24 are rotated counterclockwise. This causes, via the gears 25 to 27, the small gear part of the sun gear 28 to rotate clockwise. Then, a clockwise rotating torque is applied to the planet levers 31 and 32, respectively. This causes the levers 31 and 32 to turn clockwise around the shaft 28a from their positions of FIG. 1. As a result, the planet gear 29 which has been meshing with the gear 33 moves away from the latter. The planet gear 30 which has been meshing with the spool gear 35 moves away from the latter. Therefore, the sprocket 34 and the spool 36 are separated from the power transmission system to become free. The spool 36 and the sprocket 34 are thus brought into a state of being engaged with the film as a mere load on the film rewinding mechanism.

With the sub-fork 20 and the fork member 21 descending as mentioned in the foregoing to their positions as shown in FIG. 6, the upward pushing force which has been exerted on the engaging part 15b of the lever 15 by the upper end face of the sub-fork 20 disappears. This allows the lever 15 to be turned counterclockwise around the pin hole 15a by the force of the spring 16 as viewed on FIG. 1. As a result, the engaging part 15c which is disposed at the other end of the lever 15 comes to ascend to free the lever 10 from the restriction imposed by the engaging part 15c. The lever 10 is thus allowed to turn clockwise around the shaft hole 10a from its position of FIG. 2 and comes to a stop at a point where it abuts on the stopper 55.

While the first frame portion of the film is positioned at the aperture as mentioned above, the camera becomes ready for shooting with the fork member 21 inserted into the film cartridge 63 as shown in FIG. 6.

When a shutter release switch (not shown) is closed for shooting, the above stated control device causes the motor 1 to rotate counterclockwise as viewed on FIG. 3. This causes the pinion 2 to rotate counterclockwise. The gear 3 is rotated clockwise and the sun gear 4 is rotated counterclockwise. With the sun gear 4 rotated counterclockwise, a torque is applied to the planet lever 7 to cause it to turn counterclockwise around the shaft 4a. The planet lever 7 comes to a stop where the shaft-like projection 9 abuts on the stopper 53 (see FIG. 3). This disengages the planet gear 5 from the gear 17. Meanwhile, the planet gear 6 is caused to mesh with the gear 37. With the planet gear 6 meshing with the gear 37, the counterclockwise rotation of the sun gear 4 causes the planet gear 6 to rotate clockwise and the gear 37 to rotate counterclockwise. With the gear 37 rotating counterclockwise, the worm 39 is also caused to rotate counterclockwise via the transmission shaft 38 (FIG. 1). Then, the helical gear 40 rotates clockwise as viewed on FIG. 1. Therefore, the cam 41 which is coaxial with the helical gear 40 is also rotated clockwise. The mirror driving lever 44 which is engaging the cam 41 is then turned counterclockwise around the pivotal pin hole 44a as viewed on FIG. 1. As a result, the arm 44b of the mirror driving lever 44 pushes the pin 45 of the mirror 46 upward. This causes the mirror 46 to turn clockwise around the shaft 47. The position of the mirror 46 is thus shifted from a mirror-down position (a finder sighting position) to a mirror-up position (a retracted position for shooting). When the fore end of the mirror driving lever 44 reaches a maximum lifting position of the cam 41, a current supply to the motor 1 is cut off by the above stated control device to bring the rotation of the motor 1 to a stop. The mirror 46 is thus kept in the mirror-up position. While the lever 44 is being turned as mentioned above, the other helical gear 42 and the cam 43 are rotated counterclockwise. This, therefore, causes the pin 49b of the charge lever 49 which has been abutting on the cam 43 in the maximum lift position thereof to move to the low lift position of the cam 43. The lever 49 is, therefore, caused to turn clockwise around the shaft 49a. As a result, the shutter charge lever 50 which is engaging the pin 49c of the lever 49 is caused by the force of the spring 51 to move downward as viewed on FIG. 1 following the lever 49. This brings a shutter mechanism (not shown) into an operative state by releasing it from a state of being locked and charged. With the mirror 46 having been thus uplifted, a magnet (not shown) which is provided for the shutter is energized to operate the shutter mechanism for an exposure.

After completion of the exposure, the above stated control device again causes the motor 1 to rotate counterclockwise. The sun gear 4 is then rotated also counterclockwise. Although a counterclockwise torque is then applied via the shaft 4a to the planet lever 7, the stopper 53 prevents the lever 7 from turning counterclockwise as shown in FIG. 3. Therefore, a slip takes place between the sun gear 4 and the planet lever 7 to allow the rotation of the sun gear 4 to be transmitted to the planet gears 5 and 6. This causes the planet gears 5 and 6 to rotate clockwise in their positions shown in FIG. 3. The clockwise rotation of the planet gear 6 causes the gear 37 to rotate counterclockwise. This in turn causes the worm 39 to rotate also counterclockwise. The helical gear 40 and the cam 41, therefore, come to rotate clockwise. The clockwise rotation of the cam 41 causes the mirror driving lever 44 which has been in the maximum lift position on the cam 41 to begin to turn clockwise around the shaft 44a. As a result, the pin 45 of the mirror 46 descends to allow the mirror 46 to be turned counterclockwise around the support shaft 47 by the force of the spring 48. The mirror 46 thus begins to descend from the mirror-up position. When the mirror driving lever 44 and the cam 41 return to their relative positions as shown in FIG. 1, the mirror 46 resumes the mirror-down position. At the same time, the control device brings the motor 1 to a stop.

During the process of the above stated descent of the mirror 46, the helical gear 42 and the cam 43 turn counterclockwise, continuing their motions made before the exposure. In the meantime, the pin 48b of the charge lever 49 moves relative to the cam 43 from the low lift cam position to the maximum cam lift position. The pin 49b thus again comes to the maximum lift position on the cam 43 when the rotation of the motor 1 comes to a stop. Therefore, the shutter charge lever 50 is pushed upward from a lower position to a higher position accordingly as the cam 43 rotates. The leading and trailing shutter curtains (not shown) are charged by this. As a result, the spring 51 is elongated into a charged state. Meanwhile, the shutter is locked to prevent it from being inadvertently operated.

In the case of this embodiment, the helical gears 40 and 42 and the cams 41 and 43 are arranged to make one turn during one ascending-and-descending cycle of the mirror 46.

After completion of one ascending-and-descending cycle of the mirror 46, the control device causes the motor 1 to rotate clockwise. The pinion 2 is then rotated clockwise. This in turn causes the sun gear 4 to rotate clockwise as viewed on FIG. 3. At that time, the planet lever 7 is being prevented from turning counterclockwise around the shaft 4a. However, the clockwise turn of the planet lever 7 is not prevented. Therefore, the lever 7 turns clockwise, as viewed on FIG. 3, when a clockwise turning torque is applied to the shaft 4a. This causes the planet gear 6 to move away from the gear 37. Meanwhile, the planet gear 5 comes to mesh with the gear 17. The planet lever 7 comes to a stop in a position where it abuts on the stopper 52.

With the planet gear 5 meshing with the gear 17, the sun gear 4 causes the planet gear 5 to rotate counterclockwise, and the gear 17 to rotate clockwise. Accordingly, the gear 18 is rotated counterclockwise, and the rewinding gear 19 is rotated clockwise. In this instance, the film rewinding mechanism is then in a state shown in FIG. 6. The clockwise rotation of the rewinding gear 19 brings about no relative axial movement between the sub-fork 20 and the rewinding gear 19. There occurs also no relative axial movement between the fork member 21 and the sub-fork 20. Therefore, the rewinding gear 19, the sub-fork 20 and the fork member 21 rotate together as one unified body. This enables the fork 21c to rotate clockwise the film spool 64 within the film cartridge 63 so that the film F can be rewound and moved back into the film cartridge 63.

When just one frame portion of the film F is rewound back into the film cartridge 63, the above stated control device stops the rotation of the motor 1 in response to the output of a film feeding amount detector which is not shown. During the film rewinding action, the sprocket 34 and the spool 36 are separated from the power transmission system to remain in a free state.

The actions described above are repeated every time one frame portion of the film is used for shooting. Upon completion of a photographing operation on the film, the used portion of film is taken up back into the film cartridge 63, so that the used portion of film can be prevented from being exposed to light when the back lid of the camera is inadvertently opened. Driving control is thus performed in such a manner that, after completion of photographing on all the frame portions of film, the whole film is taken up into the inside of the film cartridge 63, so that the cartridge 63 can be immediately taken out from the inside of the camera without any further film rewinding process.

The planet lever 7 is in a position shown in FIG. 3 during a photographing operation and in a position shown in FIG. 2 during the one frame advancing (or feeding) process. Whereas, the lever 10 is in a position shown in FIG. 3 both during the photographing operation and during the one frame advancing process.

When the back lid of the camera is opened to take the film cartridge 63 out from the camera, the back lid projection 14 moves downward from its position shown in FIG. 3 (toward the rear of the camera). This movement allows the arm 12a of the lever 12 to be pulled downward by the force of the spring 13. The lever 12 is thus turned counterclockwise around the shaft hole 10a of the lever 10. The engaging part 12c which protrudes from the arm 12b of the lever 12 then comes to engage the right side face of the lever 10. The arm 12b and the lever 10 thus join to each other. The levers 10 and 12 are then turned counterclockwise around the shaft hole 10a by the force of the spring 13. The lever 10 comes to a stop at a position shown in FIG. 2 when abutting on the stopper 54. The arm 12a of the lever 12 then also comes to a stop at a position indicated by a two-dot-chain line in FIG. 2. Further, since the spring 13 is arranged to have a stronger force than the force of the spring 11 as mentioned in the foregoing, the lever 10 is caused to be turned along with the lever 12 when the lever 12 is turned counterclockwise by the spring 13 from the position thereof shown in FIG. 3. At that time, the planet lever 7 is in its position shown in FIG. 2 as mentioned in the foregoing. Therefore, when the lever 10 turns from the position shown in FIG. 3 toward the position shown in FIG. 2, the fore and face of the lever 10 comes into sliding contact with the shaft-like projection 8 provided on the planet lever 7. However, in the case of this embodiment as mentioned in the foregoing, the fore end face of the lever 10 is formed in an arcuate or tubular surface shape. Therefore, the fore end face of the lever 10 smoothly comes to engage the shaft-like projection 8 without having any angular part collide against the shaft-like projection 8.

Further, when the lever 10 reaches the position shown in FIG. 2 from the position shown in FIG. 3, the sub-fork 20 of the film rewinding mechanism is in its lowered position. The engaging part 15c of the lever 15 is, therefore, in an uplifted position. This condition enables the engaging part 10b of the lever 10 to be set in a more leftward position than the engaging part 15c without colliding against the engaging part 15c.

When the back lid is opened, a back lid opening and closing detecting switch (not shown) operates. In response to this, the above stated control device causes the motor 1 to rotate counterclockwise. With the motor 1 thus rotated counterclockwise, the sun gear 4 rotates counterclockwise to apply a torque to the planet lever 7 to urge it to turn counterclockwise around the shaft 4a. However, since the lever 7 has already been restricted to the position shown in FIG. 2 by the lever 10, the lever 7 does not turn counterclockwise. The counterclockwise rotation of the sun gear 4 is converted into the clockwise rotation of the planet gear 5. The clockwise rotation of the planet gear 5 then causes via the gears 17 and 18 the rewinding gear 19 to rotate counterclockwise. In this case, in the film rewinding mechanism which is in a state shown in FIG. 6, relative axial and upward movements are possible between the rewinding gear 19 and the sub-fork 20 and between the sub-fork 20 and the fork member 21. Therefore, the sub-fork 20 is first allowed to ascend within the rewinding gear 19 through its screwed relation to the rewinding gear 19. Following this, the fork member 21 is allowed to ascend within the sub-fork 20 by virtue of its screwed relation to the sub-fork 20. The sub-fork 20 and the fork member 21 are eventually brought into a state of being stowed in the tubular part of the keep plate 61 and the rewinding gear 19, as shown in FIG. 5. After that, the rewinding gear 19, the sub-fork 20 and the fork member 21 rotate all together. Therefore, the fork member 21 is pulled out from the film cartridge 63 and is completely retracted from the cartridge chamber to enable the film cartridge 63 to be readily taken out from the chamber.

Meanwhile, the ascent of the sub-fork 20 and the fork member 21 from the positions shown in FIG. 6 to the positions shown in FIG. 5 causes the upper end face of the sub-fork 20 to push upward the engaging part 15b of the lever 15. This causes the lever 15 to turn clockwise around the pivotal shaft hole 15a as viewed on FIG. 1. As a result, the other engaging part 15c of the lever 15 comes to engage the engaging part 10b of the lever 10. The lever 10 is then locked in its position shown in FIG. 2. Then, when the sub-fork 20, the fork member 21 and the rewinding gear 19 assume their positions shown in FIG. 5, the control device brings the motor 1 to a stop.

As described in the foregoing, the camera according to this invention is arranged to use the power of one and the same motor for a film pre-winding action, a film rewinding action and other preparatory actions for photographing (such as mirror uplifting and lowering actions, a shutter charging action, etc. described in the foregoing). The inventive arrangement thus permits use of the power source (motor) of a camera for varied purposes. In accordance with the invention, therefore, the number of motors (power sources) can be reduced to prevent an increase in manufacturing cost. Further, in the case of this embodiment, the camera is arranged to have the connection of one and the same power source to a plurality of power consuming devices switched from one device over to another in association with the ascent and descent of of the fork member included in the film rewinding mechanism. The invention thus permits the camera to have a relatively simple power transmission and switch-over mechanism.

What is claimed is:

1. A camera of the pre-winding type, in which a loaded film is wound prior to a photographing operation which is performed with the film being rewound, comprising:
   (a) a built-in motor;
   (b) a film winding mechanism arranged to be driven by said motor serving as a drive source;
   (c) a mirror mechanism arranged to be driven by said motor serving as a drive source;
   (d) a film rewinding mechanism arranged to be driven by said motor serving as a drive source; and
   (e) switching means for transmitting an output of said motor to said film winding mechanism or said mirror mechanism in response to rotation of said motor in a first direction and for transmitting an output of said motor to said film rewinding mechanism in response to rotation of said motor in a second direction, said switching means being arranged to change over the transmission of an output of said motor when rotating in said first direction from transmission to said film winding mechanism to transmission to said mirror mechanism in response to the rotation of said motor in said second direction.

2. A camera according to claim 1, wherein an output of said motor is arranged to be selectively transmitted to said film rewinding mechanism or to said mirror mechanism by means of a planetary clutch.

3. A camera according to claim 1, wherein said mirror mechanism is arranged to move from a view-finder sighting position to a retracted position for photographing and from said retracted position to said view-finder sighting position in response to the rotation of said motor in said first direction.

4. A camera according to claim 1, wherein said film rewinding mechanism has a connection member capable of advancing and retracting in the axial direction of a film cartridge, said connection member being arranged to be connectable to a film spool in the film cartridge.

5. A camera according to claim 1, wherein said switching means includes a planetary clutch, said planetary clutch being arranged to transmit an output of said motor to said mirror mechanism in response to the rotation of said motor in said first direction and to transmit an output of said motor to said film rewinding mechanism in response to the rotation of said motor in said second direction, and wherein said switching means further includes a blocking mechanism for blocking a change-over action of said planetary clutch, said blocking mechanism being arranged to block, in an initial state where a film cartridge has been loaded, the change-over action of said planetary clutch which is performed when said motor rotates in said first direction, so as to transmit an output of said motor to said film winding mechanism.

6. A camera according to claim 5, wherein a blocking state of said blocking mechanism is cancelled in response to the rotation of said motor in said second direction, and wherein after said blocking state has been cancelled, an output of said motor when rotating in said first direction is transmitted to said mirror mechanism.

7. A camera according to claim 6, wherein said film rewinding mechanism includes a connection member connectable to a film spool in a film cartridge, said connection member being arranged to advance from a non-connective position where said connection member is not connected to said film spool to a connective position where said connection member is connected to said film spool in accordance with the rotation of said motor in said second direction, wherein said blocking state of said blocking mechanism is cancelled in response to advancement of said connection member from said non-connective position to said connective position, and wherein after said blocking state has been cancelled, an output of said motor when rotating in said first direction is transmitted to said mirror mechanism.

8. A camera of the pre-winding type, in which a loaded film is wound prior to a photographing operation which is performed with the film being rewound, comprising:
(a) a built-in motor;
(b) a film winding mechanism arranged to be driven by said motor serving as a drive source;
(c) a shutter charge mechanism arranged to be driven by said motor serving as a drive source;
(d) a film rewinding mechanism arranged to be driven by said motor serving as a drive source; and
(e) switching means for transmitting an output of said motor to said film winding mechanism or said shutter charge mechanism in response to rotation of said motor in a first direction and for transmitting an output of said motor to said film rewinding mechanism in response to rotation of said motor in a second direction, said switching means being arranged to change over the transmission of an output of said motor when rotating in said first direction from transmission to said film winding mechanism to transmission to said shutter charge mechanism in response to the rotation of said motor in said second direction.

9. A camera according to claim 8, wherein an output of said motor is arranged to be selectively transmitted to said film rewinding mechanism or to said shutter charge mechanism by means of a planetary clutch.

10. A camera according to claim 8, wherein said shutter charge mechanism is arranged to move from a charging position to a charge cancelling position and from said charge cancelling position to said charging position in response to the rotation of said motor in said first direction.

11. A camera according to claim 8, wherein said film rewinding mechanism has a connection member capable of advancing and retracting in the axial direction of a film cartridge, said connection member being arranged to be connectable to a film spool in the film cartridge.

12. A camera according to claim 8, wherein said switching means includes a planetary clutch, said planetary clutch being arranged to transmit an output of said motor to said shutter charge mechanism in response to the rotation of said motor in said first direction and to transmit an output of said motor to said film rewinding mechanism in response to the rotation of said motor in said second direction, and wherein said switching means further includes a blocking mechanism for blocking a change-over action of said planetary clutch, said blocking mechanism being arranged to block, in an initial state where a film cartridge has been loaded, the change-over action of said planetary clutch which is performed when said motor rotates in said first direction, so as to transmit an output of said motor to said film winding mechanism.

13. A camera according to claim 12, wherein a blocking state of said blocking mechanism is cancelled in response to the rotation of said motor in said second direction, and wherein after said blocking state has been cancelled, an output of said motor when rotating in said first direction is transmitted to said shutter charge mechanism.

14. A camera according to claim 13, wherein said film rewinding mechanism includes a connection member connectable to a film spool in a film cartridge, said connection member being arranged to advance from a non-connective position where said connection member is not connected to said film spool to a connective position where said connection member is connected to said film spool in accordance with the rotation of said motor in said second direction, wherein said blocking state of said blocking mechanism is cancelled in response to advancement of said connection member from said non-connective position to said connective position, and wherein after said blocking state has been cancelled, an output of said motor when rotating in said first direction is transmitted to said shutter charge mechanism.

15. A camera of the pre-winding type, in which a loaded film is wound prior to a photographing operation which is performed with the film being rewound, comprising:
   (a) a built-in motor;
   (b) a film winding mechanism arranged to be driven by said motor serving as a drive source;
   (c) an exposure preparing mechanism arranged to be driven by said motor serving as a drive source;
   (d) a film rewinding mechanism arranged to be driven by said motor serving as a drive source; and
   (e) switching means for transmitting an output of said motor to said film winding mechanism or said exposure preparing mechanism in response to rotation of said motor in a first direction and for transmitting an output of said motor to said film rewinding mechanism in response to rotation of said motor in a second direction, said switching means being arranged to change over the transmission of an output of said motor when rotating in said first direction from transmission to said film winding mechanism to transmission to said exposure preparing mechanism in response to the rotation of said motor in said second direction.

16. A camera according to claim 15, wherein an output of said motor is arranged to be selectively transmitted to said film rewinding mechanism or to said exposure preparing mechanism by means of a planetary clutch.

* * * * *

UNITED STATES PATENT AND TRADEMARK OFFICE
CERTIFICATE OF CORRECTION

PATENT NO. : 4,963,905

DATED : October 16, 1990

INVENTOR(S) : Shosuke Haraguchi, et al.

It is certified that error appears in the above-identified patent and that said Letters Patent is hereby corrected as shown below: ON TITLE PAGE:

[56] References Cited:

Under "U.S. PATENT DOCUMENTS", "Nematsu et al." should read --Uematsu et al.--.

COLUMN 4:

Line 39, "effected" should read --connected--.

COLUMN 7:

Line 18, "sun" should read --the sun--.

Line 26, "cased" should read --caused--.

Line 62, "a" should be deleted.

Signed and Sealed this

Twenty-sixth Day of May, 1992

*Attest:*

DOUGLAS B. COMER

*Attesting Officer*  *Acting Commissioner of Patents and Trademarks*